United States Patent [19]
Crimmins, Jr.

[11] Patent Number: 4,516,939
[45] Date of Patent: May 14, 1985

[54] FINGER CONTROL SYSTEM

[75] Inventor: Arthur G. Crimmins, Jr., Tillamook, Oreg.

[73] Assignee: Quill Licensing, Ottowa, Canada

[21] Appl. No.: 370,195

[22] Filed: Apr. 21, 1982

Related U.S. Application Data

[63] Continuation-in-part of Ser. No. 42,077, May 24, 1979, abandoned.

[51] Int. Cl.³ .............................................. G09B 21/00
[52] U.S. Cl. ...................................... 434/114; 434/258; 200/6 A; 340/407; 340/365 R; 400/492; 400/389
[58] Field of Search .............................. 434/30, 32–34, 434/37, 38, 45, 46, 49, 55–59, 112–116, 185, 227–232, 258; 273/DIG. 28, 1 GC; 200/6 A; 340/407, 365 R; 400/489, 492

[56] References Cited

U.S. PATENT DOCUMENTS

| | | | |
|---|---|---|---|
| 2,657,476 | 11/1953 | Holcombe | 434/30 |
| 3,021,611 | 2/1962 | Goodell et al. | 434/231 |
| 3,022,878 | 2/1962 | Seibel et al. | 340/365 R |
| 3,166,856 | 1/1965 | Uttal | 434/233 |
| 3,277,587 | 11/1966 | Holcombe | 434/233 |
| 3,428,747 | 2/1969 | Alferieff | 340/365 R |
| 3,723,687 | 3/1973 | Adkinson | 200/18 |
| 3,781,802 | 12/1973 | Kafafian | 434/112 |
| 3,831,296 | 8/1974 | Hagle | 434/112 |
| 3,869,812 | 3/1975 | Arakelian et al. | 434/258 |
| 3,894,346 | 7/1975 | Ward et al. | 434/228 |
| 3,982,236 | 9/1976 | Kafafian | 340/407 |
| 4,044,475 | 8/1977 | Fujisawa et al. | 434/231 |
| 4,074,444 | 2/1978 | Langer et al. | 434/112 |
| 4,095,791 | 6/1978 | Smith et al. | 273/85 G |
| 4,216,965 | 8/1980 | Morrison et al. | 273/1 E |
| 4,350,055 | 9/1982 | Pinomäki | 200/6 A |

FOREIGN PATENT DOCUMENTS 308048  9/1918  Fed. Rep. of Germany ...... 400/489

Primary Examiner—Vance Y. Hum
Assistant Examiner—Leo P. Picard
Attorney, Agent, or Firm—John G. Abramo

[57] ABSTRACT

The invention is a method and apparatus for utilizing finger control switches connected to a binary code receiver for the purpose of driving a printer and/or a visual and/or audible readout device. The device is made up of a number of switches normally in the open position which can be depressed to a closed position. The input from the switches is communicated to a binary code receiver, which activates a printer, a visual readout or an audible device. The apparatus is used both for communication to other equipment and as a teaching device for physically demonstrating the combination of switch positions required to produce a given command.

10 Claims, 7 Drawing Figures

FINGER CONTROL SYSTEM

This is a continuation-in-part of my application entitled FINGER CONTROL SYSTEM filed May 24, 1979 and bearing Ser. No. 042,077 which will be abandoned.

BACKGROUND OF THE INVENTION

This invention relates to an apparatus and method of controlling any equipment capable of accepting commands from a binary code receiver. The invention is adapted to both train an operator and to transmit the input of an operator to a number of devices such as a typewriter, musical instrument or any equipment requiring instructions such as a helicopter, an airplane, and the like.

NATURE OF THE PRIOR ART

A number of prior art devices are known.

U.S. Pat. No. 3,166,856 to W. R. Uttal describes an educational device for the teaching of touch typing. It involves a pair of gloves which the operator puts on his hands and through contacts located in the fingertips, which match contacts located in the keyboard, the student is enabled to close a circuit when his fingertips touch the correct key on a typewriter keyboard. This will allow the key to be depressed and the letter to be struck on the typewriter. The device does not teach in the sense of directing the operator's fingers through the correct sequence of operation but teaches in the sense that unless the correct key is struck, there is no response from the instrument.

U.S. Pat. No. 3,277,587 to R. L. Holcombe describes a tactile training system in which a signal from loops on the finger of an instructor is transmitted to a solenoid or vibrator on each of the fingers of a student. The device is limited to teaching a person which finger should be used on a keyboard. However, the device does not show which key on the keyboard is to be depressed except by a visual representation. The student must look for the key on his keyboard.

Maling, in U.S. Pat. No. 3,693,184, describes a typewriting apparatus which is adapted to generate signals corresponding to predetermined coded verbal data. By depressing a particular key, an operator is enabled to print out an entire word rather than a particular character. This device has no provision for feedback or training the operator in its operation.

U.S. Pat. No. 3,831,296 to Edward D. Hagle describes a method for communicating with blind or deaf persons. It involves a pair of gloves with a multiplicity of sensors located along the fingers and enables a party with the appropriate keyboard to communicate with a person who is deaf and blind.

U.S. Pat. No. 4,055,905 issued to C. R. Budrose involves another touch-type teaching device which sensors are placed inside of gloves which are worn over the fingers of the operator. Each finger has a conductive pad which completes the circuit on contact with a key. Touching the wrong key will inhibit the circuit and prevent the key from being depressed.

None of the above inventions combine the function of providing a tactile signal to an operator which, at the same time, shows him which finger to use and the particular key or button to depress on a keyboard. In addition, none of the above devices combine the above tactile teaching system with a means of generating more than one letter or note.

SUMMARY OF THE INVENTION

The present invention in its apparatus aspect is a device which involves the manipulation of ten switches which have two modes, e.g., an on and off position, and are, therefore, adapted to the production of binary code sequences containing $2^{10}$ commands or 1023 commands. The switches are manipulated either manually by an operator who pushes one or more solenoid armatures placed over the switches into contact with the switches thereby closing them or electrically by a signal sent from a computer to one or more solenoid coils. When the coil is activated, it generates a magnetic field which forces the armature in contact with a switch and closes it.

The switches are divided into two groups of five each and each group of five switches is on a left and right handle support so that when the fingers of an operator's hand are placed on a handle, the switches are located under each of his five fingers.

The handles are connected to rocking and twisting switches such that four additional rocking modes and two additional twisting modes are engaged for each of the hands of the operator thereby inreasing the number of binary code sequences by $2^{12}$ or a total of $2^{22}$ commands which works out to 4,194,304 available commands.

Once a particular sequence of finger positions and rocking and twisting modes are selected by an operator, the command is transmitted by releasing all the finger switches.

The binary code receiver accepts the sequence of signals from the switches and translates them according to the computer program embodied in its system. The binary code receiver also passes signals on to a visual display or printer or to a mechanical device such as a typewriter, motor vehicle, helicopter and the like.

In the teaching method aspect of the invention, signals are sent from a teaching system to the solenoids which thereby act on the armature and manipulate the switches in the desired sequence. A corresponding signal is also sent to the binary receiver which transmits the coded information to audio or visual communication devices. The operator has his hands on the armatures and can feel which switches are moved. In the next phase, the student is required to repeat the prior sequence communicated to him tactically and/or visually and/or audibly. Successful duplication of the sequence is communicated to the operator by the communication devices. Unsuccessful duplication of the sequence is also communicated to the student by the same means and the correct sequence is again repeated by the system. The student again attempts to duplicate the sequence. This process continues until the operator is taught the correct order of sequences required.

The teaching method can be combined to include both visual and audible indications of the correct and incorrect operation of the switches.

DETAILED DESCRIPTION OF THE INVENTION

Figure 2:
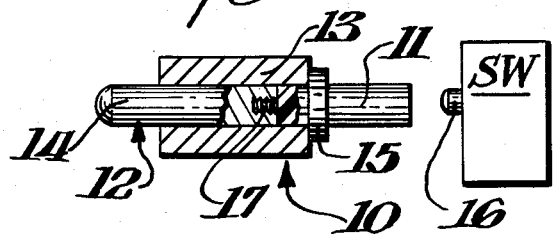
FIG. 2 is a cross-sectional view taken along line 2—2 of FIG. 1 illustrating a typical solenoid 10.

Referring now to the drawings, FIG. 2 shows a solenoid 10 in cross-sectional view. An electromagnetic coil 13 encloses an armature 12 having a non-magnetic section 11 and a magnetic section 14. The magnetic section 14 is an iron rod which is drawn into the electromagnetic coil 13 when an electrical current is passed through the coil 13 and thereby generates a magnetic field. When the megnetic section 14 is pulled into the coil 13, the non-magnetic section 11 is forced against the contact 16 on a switch (SW) and closes the switch, which is normally open. A shoulder 15 acts as a stop and prevents the armature 12 from coming out of the solenoid 10. The magnetic section 14 is attached to the non-magnetic section 11 by means of the threaded post 17 on the non-magnetic section 11. Other fastening means may also be employed.

The apparatus described below is adapted to be used by the right hand of the operator. The identical device except that it is adapted to the left hand of an operator is also part of the device as is evident from FIG. 1 wherein all ten fingers are engaged. However, FIGS. 4, 5, 6 and 7 all show only the right handle and its rocking and twisting switches.

Figure 4:
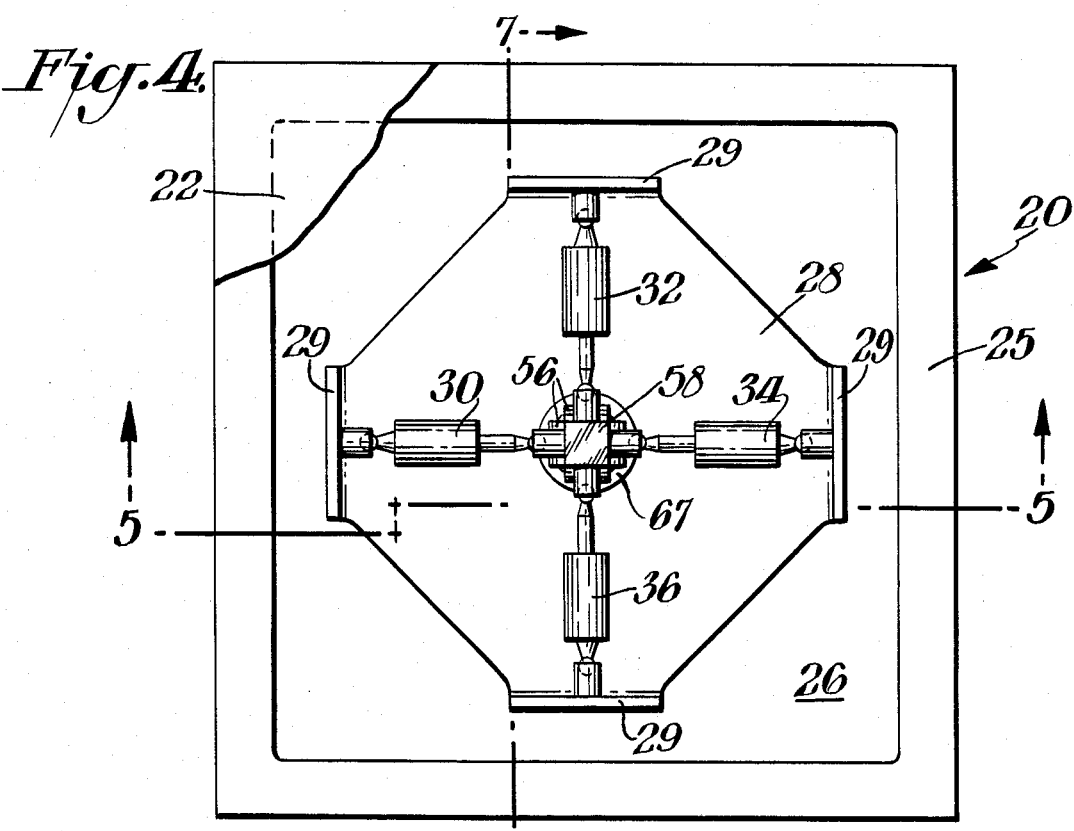
FIG. 4 is a top plan view of the right handle control with the handle removed.

Referring to FIGS. 4, 5, 6 and 7, a housing 20 has a top plate 22 shown broken away in FIG. 4. The top plate 22 has a hole 21 which allows for movement of the handle 58. The housing 20 has side walls 24 that terminate in an outer extending rim 25 that the top cover plate 22 is mounted to and a floor 26. Inside the housing 20 is an inner rotational platform 28 having four vertical extending arms 29. As shown in FIG. 4, solenoids 30, 32, 34 and 36 are connected between the vertical arms 29 of the platform 28 and handle shaft 58. Attached to each solenoid is a switch similar to the one described in FIG. 2, but the details of their use is different as is evident from the following description.

Figure 5:
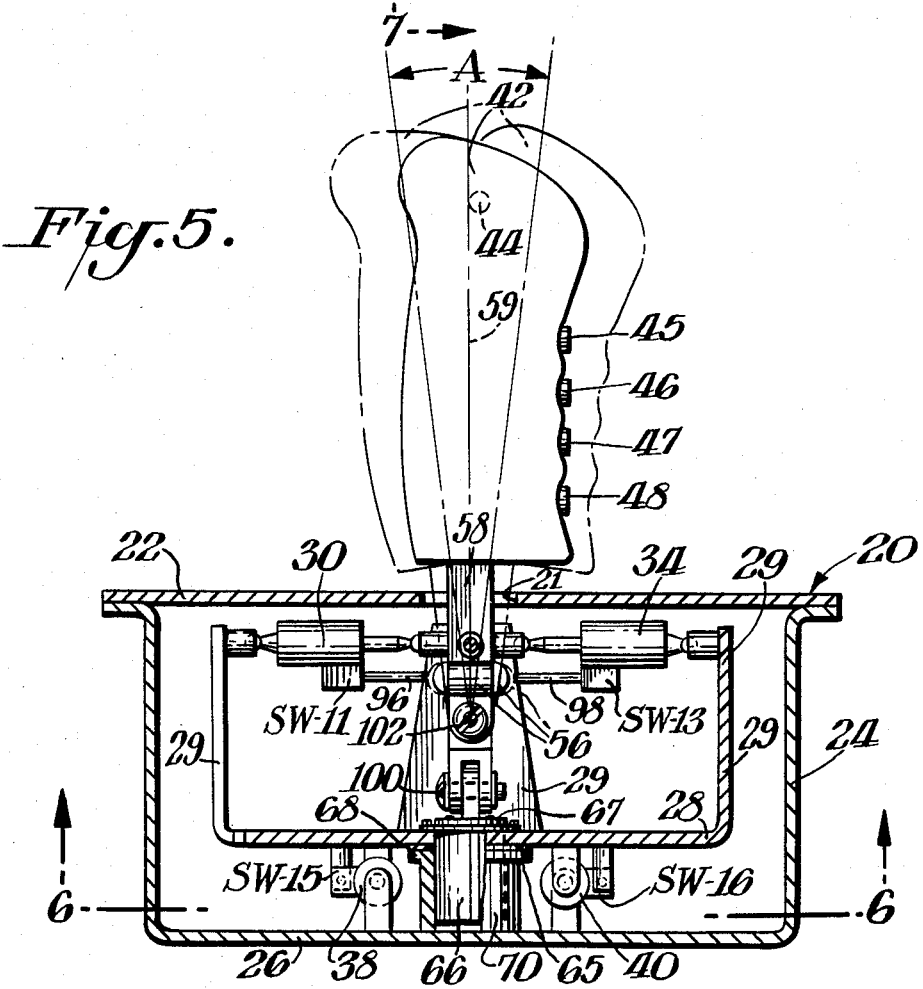
FIG. 5 is a cross-sectional side elevational view taken along line 5—5 of FIG. 4 with the handle in place indicating movement of the handle axis through arc A.
Figure 7:
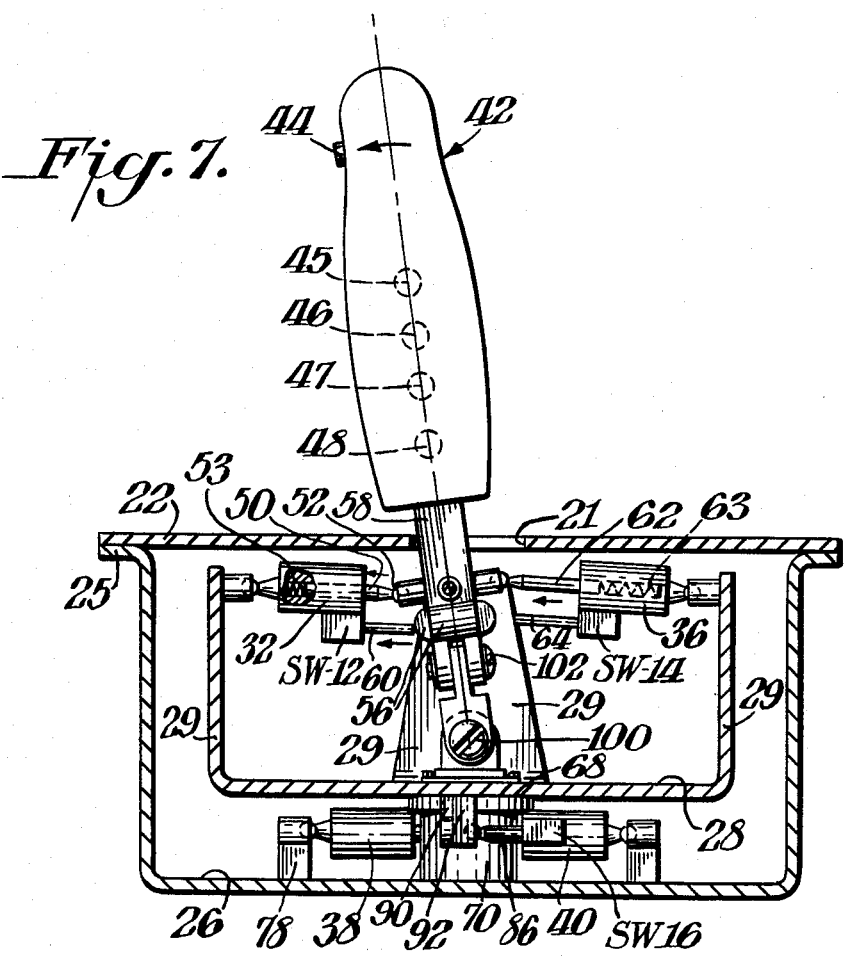
FIG. 7 is a cross-sectional end elevational view showing the handle in one operative position taken along line 7—7 of FIG. 4.

Referring to FIG. 7, the solenoid 32 having a switch 12 mounted on its body has a spring loaded armature 50 attached at one end by ball mount 52. The ball mount 52 is attached to the control handle 42 through a shaft 54. As is shown in FIG. 7, a protuberance 56 on the shaft 58 of the handle 42 contacts the contact 60 for switch SW-12. It will be noted that the contact 60 for SW-12 is more elongated than those shown in FIG. 2 wherein a short contact 16 is present. The handle 42 is rocked to the left around pivot bolt 100. Pivot bolt 102 provides the pivot point for front and back rocking motion of the handle 42 as shown in FIG. 5. Front and back rocking activates a different series of solenoids as will be explained below. When contact is made with SW-12, the solenoid 36 has its armature 62 extended outward by spring 63 and the protuberance 56, which is on both sides of the shaft 58, does not make contact with the contact 64 for switch SW-14.

The four opposing spring loaded solenoids 30, 32, 34 and 36 always maintain handle 42 in a neutral vertical position when the handle is not being used to perform a signal function. Solenoids 38 and 40 always maintain the handle 42 in a neutral untwisted position when the handle is not being used to perform a signal function.

During the side to side and back and forth rocking of the handle, the inner rotational platform 28 is stationary and does not move. The platform 28 is mounted on the shoulder 68 of a bearing 70 which surrounds the shaft 66 which supports the handle 42. A retainer ring 67 bolted to the platform 28 keeps the handle 42 in place. A disk bearing 65 having an appropriate lubricant assists in the rotational movement of the platform 28.

Figure 6:
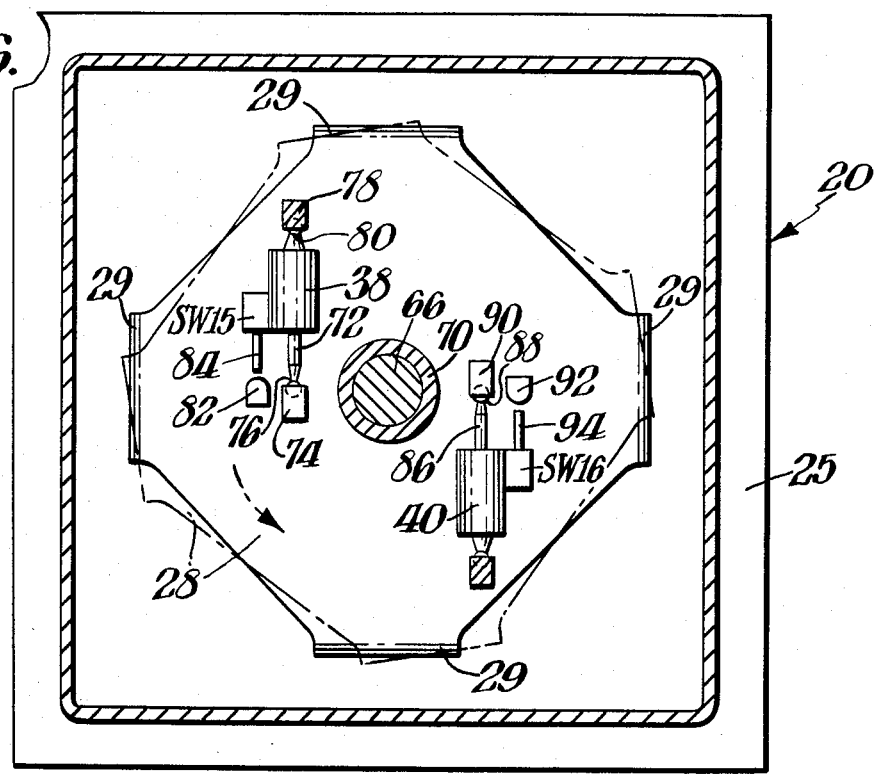
FIG. 6 is a cross-sectional bottom plan view taken along line 6—6 of FIG. 5.

Referring now to FIG. 6, the twisting mode of operation is suggested by the phantom outline of the platform 28 as seen from a bottom view. Solenoid 38 has an armature 72 attached to post 74 by a ball mount 76. Post 74 is attached to the bottom of platform 28. Post 78 is attached by a ball mount 80 to the solenoid 38 and the floor 26 of the housing 20. The platform 28 rotates about shaft 66 by means of the bearing 70.

When the rotation shown in phantom in FIG. 6 is done, switch SW-15 is moved toward post 82. Contact 84 meets post 82 and sends a signal to the binary receiver.

The solenoid 40 has its armature 86 pulled out by ball mount 88 connected to post 90. Post 92 also moves away from SW-16 and its contact 94 by the movement indicated in phantom in FIG. 6.

As shown in FIG. 5 by phantom outline, the handle 42 may be rocked backward and forward through the Angle A.

The backward motion of handle 42 will cause protuberance 56 on shaft 58 to contact 98 of SW-13 to the ON or send condition, likewise, the forward motion of handle 42 will cause protuberance 56 to engage contact 96 of SW-11 to the ON or send condition. During the ON or send condition, an appropriate signal is transmitted to the binary system.

Referring now to FIG. 7, the handle 42 is shown rocked to the left and the protuberance 56 on shaft 58 touches the contact 60 on SW-12 and thereby sends a signal to the binary receiver. If the handle 42 was rocked correspondingly to the right, then the protuberance 56 would then contact 64 associated with SW-14 and again another signal would be sent.

FIG. 6 has shown the way the contacts 84 and 94 are arranged when the platform 28 is twisted to the left. By reference to FIG. 5, it is seen that if the handle 42 was twisted to the left or right of the vertical axis 59, the motion indicated in phantom on FIG. 6 would take place. In order to engage the contact 94 on SW-16, the handle 42 must be twisted to the right above the vertical axis 59 in order to make that contact.

Figure 1:
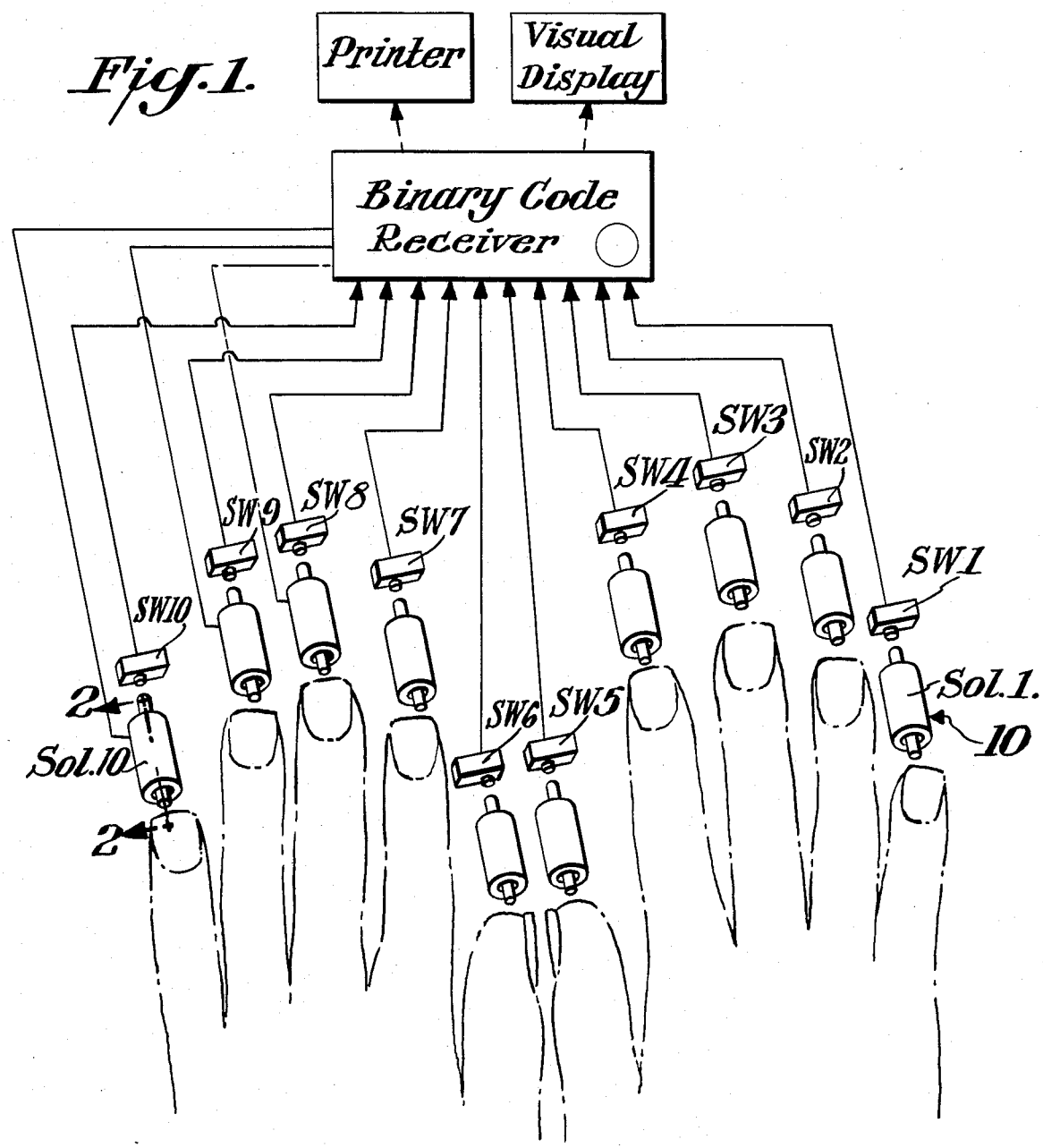
FIG. 1 diagramically illustrates a finger control system for generating symbols or words.

As previously mentioned, FIGS. 4, 5, 6 and 7 are all concerned only with the right-handed finger control system and, in use, as is suggested in FIG. 1, there would be a corresponding left-handed finger control system. The right and left hand finger control systems would be located on a table or on the arms of a chair or in any suitable position within easy reach of an individual.

For the purpose of showing a relationship of FIG. 1 with the subject matter of FIGS. 4, 5, and 6, it will be seen that the five positions shown in FIG. 7 are with a right thumb button 44 which corresponds to switch SW-5 in FIG. 1, right index finger button 45 corresponding to SW-4 in FIG. 1, right middle finger button 46 corresponding to SW-3 of FIG. 1, right ring finger button 47 corresponding to SW-2 of FIG. 1 and right little finger button 48 corresponding to SW-1 of FIG. 1.

Thus, in order to operate the device without any of the rocking or twisting motions, the operator merely grabs the handle 42 with its five buttons and begins manipulating the combinations which will transmit the signals to the binary receiver. The left hand is similarly engaged.

When it is desired to use this system as a teaching system, then the operator merely puts his hands on the buttons of the handle. The binary receiver which is programed to be in a teaching mode, after receiving the appropriate signal, causes the solenoids to be depressed in the five buttons in a programed sequence and shows the operator the particular sequence that is related to the command that is to be taught to the operator.

The binary receiver and the processors can also manipulate the twisting and rocking modes of operation which have been shown in FIGS. 4, 5 and 6, and when it is desired to show an individual a particular sequence, using the rocking and twisting modes, the program using those modes is put into the device and shown to the person. Thereafter, the machine is returned to the neutral position and the operator is required to duplicate the same sequence of commands. A command might be one in which, for example, button 44 is depressed, button 45 is not depressed, buttons 47 and 48 are depressed and the handle is rocked to the left as in FIG. 7 so that SW-12 is engaged and is also given a twist as is shown in FIG. 6 so that SW-15 is engaged. Those commands, which are only for the right hand, might be duplicated or be different for the left hand. That sequence of commands would correspond to the particular information being taught the individual whether it be a means of controling or for writing using a pre-selected vocabulary so that the finger positions correspond to word groups.

The device is especially suited to the writing of non-alphabetically written languages such as Korean, Japanese and Chinese. By assigning a particular combination of button positions and twisting and rocking modes, literally thousands of idea graphs, such as those used in Korean, Japanese and Chinese languages, could be learned and, of course, printed without the intervention of shorthand or other transcribing devices.

As shown schematically in FIG. 1, each of the fingers of an operator or student is in contact with each armature 12 of a solenoid 10. The armature 12 can be depressed either manually by the operator or student or through the activation of the solenoid 10 electrically by the teaching system. The solenoids for rocking and twisting modes are similarly activated or engaged. When the armature 12 touches the contact 16, it closes the normally open switch located in that unit which sends a signal to the binary receiver which in turn transmits the signal to other parts of the equipment. In FIG. 1 there are ten solenoid positions, one for each finger of an operator, and ten switches, each positioned on the armature 12 of a solenoid 10. The armature 12 is felt as a button under the fingertips of the operator.

Figure 3:
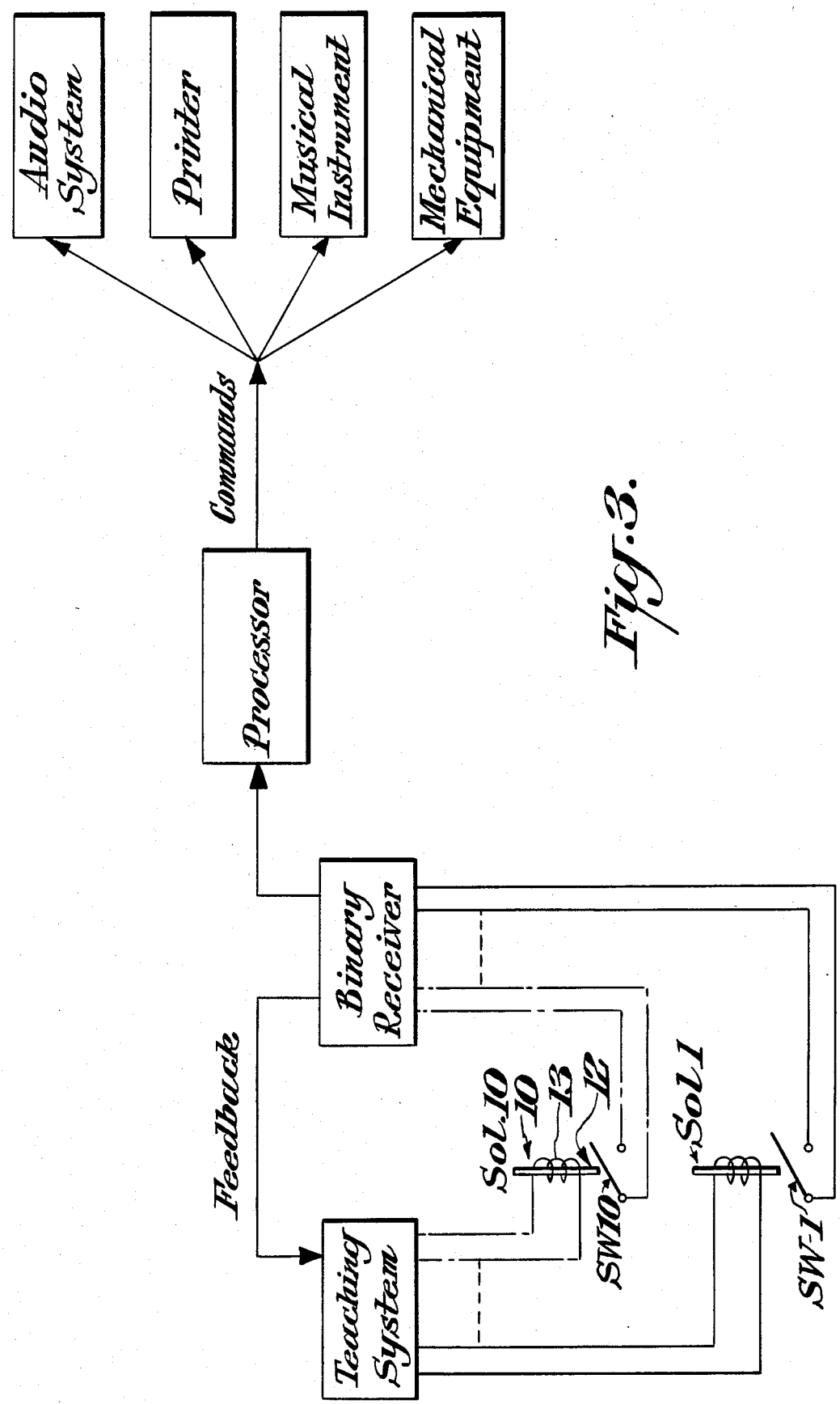
FIG. 3 is a schematic illustration showing the relationship between the switches, teaching system, binary receiver and the equipment to be commanded.

As shown schematically in FIG. 3, each switch is connected to both the binary receiver and the teaching system. The binary receiver is a computer programed to read and respond to each sequence of closed and opened switches. The teaching system can be either a computer or a person who manually manipulates the signal to the solenoid 10.

A particular sequence of opened and closed switches will correspond to a code combination previously programed and impressed into the binary receiver. The binary receiver receives a particular sequence of opened and closed switches and responds with the commands programed into the computer. The computer program employed with the binary receiver will contain a code representing all the combinations of switch sequences and a means for comparing the input from the keyboard with the expected response programed into the binary receiver.

In the teaching mode, the teaching system in FIG. 3 is activated and produces a command, for example, to Sol-1. Sol-1 is activated and depresses the armature therein to close the switch SW-1. In this way, one or more of the switches SW-1 to SW-10 will be closed. The student will feel this movement in Sol-1 (and/or the movement or movements in each of Sol-2 to Sol-10 for the other (sequences). The rocking and twisting modes can also be engaged by the teaching system. This command will be transmitted to the processor which will activate a printer and/or audio system with the message which corresponds to the sequence of open and closed switches. The entire system then returns to a neutral mode and the student is required to duplicate the sequence of armature positions previously transmitted to his fingertips with the message to which it corresponds on the printer and/or audio system. Correct duplication of the sequence is noted by the correct message being transmitted on the printer or audio system. Incorrect duplication causes the binary receiver to issue a command to the processor and feedback to the teaching system which causes the printer or audio system to issue a message telling the student that he has erred and the teaching system to repeat the correct sequence on the keyboard. This process is repeated until the student correctly repeats the desired sequence. It is apparent that this system combines both a tactile input to the student with a corresponding visual or audible message and it is this combination of tactile and visual and/or audible inputs to the student which make this teaching system so effective.

The processor issues commands to the device to be activated. In FIG. 3, the devices include a number of representative devices. An audio system includes any means for transmitting sound such as horns, loudspeakers, and the like. The printer is any means of putting a message on paper or in sheet form such as the usual computer printer, typewriters, and the like. Musical instruments will include both those with keyboards such as pianos and accordians and those which require for changing the length of the sound path such as clarinets, slide trombone, horns, and the like. Mechanical equipment includes motor vehicles, such as tractors, cranes, automobiles and the like and also airborn devices such as helicopters and airplanes.

It is preferred that the sequence of commands embodied in the code be arranged whereby the most frequently used commands are associated with the fingers of greatest dexterity. Thus, for example, in a typewriter connected to the processor, the "space bar", i.e., the command to insert a space between letters or words, is the most frequently used command, this function will be allocated to the right thumb. As the letter "E" is the most frequently used letter (in the English language), the left thumb will be used to generate this command. When the first six most frequently used commands have been assigned to the thumb, forefinger and middle finger of each hand, the next command will be assigned to some combination of these fingers, and each such following command in the order of frequency of use until a total of sixty three such individual commands have been assigned. This will exhaust the combinations available to these six fingers in the binary format used. These sixty three commands will cover the large majority of frequently used functions and letters of a standard keyboard. Following this point, additional commands will be assigned to the other four fingers as required.

This approach uses all available sensory inputs to reinforce the learning process. In addition, a suitable level of music may be used as background in view of recent studies suggesting that this approach can enhance the learning process.

The preferred embodiment of the teaching aspect of this invention requires that the exact movement by each finger of the keyboard is first shown to the student, i.e., the exact movement is tactically sensed. It is in this way that the teaching system is a tactical means. Thereafter, the student uses the same tactile means to repeat the learned movement.

What is claimed is:

1. An apparatus for the generation of a binary code comprising:
    (a) ten switches arranged in two groups of five and each group on handles adapted to the right and left hand of a human operator, each switch having a neutral mode and a depressed mode;
    (b) drive means coupled to said switches whereby the switches may be moved from the neutral mode to the depressed mode;
    (c) a binary code receiver responsive to the two modes of the switches and to a signal generated when the human operator releases the fingers of his left and right hand from the two groups of five switches whereby the sequence of switches selected is transmitted to the binary code receiver and capable of operating the drive means;
    (d) processor means connected to the binary code receiver and connected to equipment whereby the equipment receives and acts on commands transmitted by the binary code receiver; and
    (e) feedback means connected to the binary code receiver and a teaching system means whereby a person is taught how switch sequences generate commands which will operate equipment and corrections are indicated to the person by the drive means being activated by the binary code receiver.

2. An apparatus as in claim 1 wherein the handles adapted to the right and left hand of an operator are operably connected to four switches that respond to side to side and front and back rocking motions of the handle whereby additional commands can be transmitted to and received from the binary code receiver.

3. An apparatus as in claims 1 or 2 wherein the handles adapted to the right and left hand of the operator are operably connected to two switches that respond to twisting and reverse twisting movement of the handles whereby additional commands can be transmitted to and received from the binary code receiver.

4. An apparatus as in claim 3 wherein the drive means are solenoid switches.

5. An apparatus as in claim 3 wherein the equipment is a visual display device.

6. An apparatus as in claim 3 wherein the equipment is a printer.

7. An apparatus as in claim 3 wherein the equipment is mechnical equipment.

8. An apparatus as in claim 3 wherein the apparatus is used to transcribe oriental languages.

9. A teaching method which comprises:
    (a) placing the fingers of a student on a right and left handle each having five positions and each position being occupied by solenoid operated buttons each of which is coupled to a switch having a neutral mode and a depressed mode of operation;
    (b) transmitting a first coded signal to the solenoid buttons with a teaching system whereby each of the solenoid buttons are caused to react into a sequence corresponding to the coded signal and thereby change the mode of each switch associated with a solenoid and also transmit a neutral or depressed configuration to the solenoid buttons in contact with the fingers of the student;
    (c) transmitting the sequence of the switches to a binary code receiver having feedback means to the teaching system and also being conducted to a processor connected to equipment;
    (d) transmitting a second coded signal from the binary receiver to the processor connected to equipment whereby the message to be taught to the student is communicated visually or audibly;
    (e) returning the system to a neutral position and allowing the student to duplicate the previously transmitted sequence of the tactile responsive means;
    (f) reviewing the sequence of switches generated by the student; and
    (g) evaluating the correctness of the duplication by the student by the binary receiver and either transmitting the correct coded signal to the processor whereby the equipment is operated or transmitting a message that the student has erred and activating the teaching system whereby the student is caused to repeat the sequence of switches until the correct sequence is learned.

10. A method as in claim 9 wherein the equipment is an audio device or a visual display device.

* * * * *